United States Patent
Kobayashi et al.

(10) Patent No.: US 11,247,334 B2
(45) Date of Patent: Feb. 15, 2022

(54) TASK PLANNING APPARATUS, TASK PLANNING METHOD, AND NON-TRANSITORY COMPUTER-READABLE STORAGE MEDIUM

(71) Applicant: FUJITSU LIMITED, Kawasaki (JP)

(72) Inventors: Sachio Kobayashi, Sagamihara (JP); Hiroki Kobayashi, Kawasaki (JP); Daichi Shimada, Kawasaki (JP); Ryo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 16/398,378

(22) Filed: Apr. 30, 2019

(65) Prior Publication Data

US 2019/0366541 A1    Dec. 5, 2019

(30) Foreign Application Priority Data

Jun. 5, 2018    (JP) .............................. JP2018-107788

(51) Int. Cl.
| | |
|---|---|
| *B25J 9/16* | (2006.01) |
| *G06Q 10/06* | (2012.01) |
| *B25J 9/00* | (2006.01) |
| *G06Q 50/04* | (2012.01) |

(52) U.S. Cl.
CPC ............ *B25J 9/1661* (2013.01); *B25J 9/0084* (2013.01); *G06Q 10/0633* (2013.01); *G06Q 10/06316* (2013.01); *G06Q 50/04* (2013.01)

(58) Field of Classification Search
CPC ............. B25J 1/00–21/00; G06Q 10/00–50/00
USPC ............................... 700/1–89; 705/7.11–7.42
See application file for complete search history.

(56) References Cited

U.S. PATENT DOCUMENTS

| | | | | |
|---|---|---|---|---|
| 10,192,195 | B1 * | 1/2019 | Brazeau | G06Q 10/087 |
| 2003/0030398 | A1 * | 2/2003 | Jacobs | G05D 1/0225 |
| | | | | 318/568.12 |
| 2003/0030399 | A1 * | 2/2003 | Jacobs | G05D 1/0274 |
| | | | | 318/568.16 |
| 2008/0161970 | A1 * | 7/2008 | Adachi | B25J 9/1676 |
| | | | | 700/253 |

(Continued)

FOREIGN PATENT DOCUMENTS

| | | |
|---|---|---|
| JP | 10-039909 | 2/1998 |
| JP | 11-134392 | 5/1999 |

(Continued)

OTHER PUBLICATIONS

Japanese Office Action dated Nov. 16, 2021 for corresponding Japanese Patent Application No. 2018-107788, with English Translation, 5 pages.

*Primary Examiner* — Alan S Miller
(74) *Attorney, Agent, or Firm* — Fujitsu Patent Center

(57) ABSTRACT

A method includes: executing judgment processing for judging whether a site to carry out a first task assigned to a first robot and a site to carry out a second task assigned to a second robot are likely to overlap each other; executing comparison processing for comparing first end time with second end time when the sites to carry out the first task and the second task are likely to overlap each other; and executing determination processing for selecting the first task order when the first end time is earlier than the second end time, and selecting the second task order when the second end time is earlier than the first end time.

6 Claims, 16 Drawing Sheets

(56) References Cited

U.S. PATENT DOCUMENTS

| | | | |
|---|---|---|---|
| 2012/0152877 A1* | 6/2012 | Tadayon | B25J 5/005 |
| | | | 212/224 |
| 2014/0156068 A1* | 6/2014 | Graca | B25J 9/1666 |
| | | | 700/248 |
| 2015/0081373 A1 | 3/2015 | Kobayashi et al. | |
| 2015/0148951 A1* | 5/2015 | Jeon | G05D 1/0274 |
| | | | 700/248 |
| 2017/0001317 A1* | 1/2017 | Katayama | H05B 47/165 |
| 2017/0028559 A1* | 2/2017 | Davidi | B25J 9/1682 |
| 2017/0148116 A1* | 5/2017 | Grossman | G06Q 10/06311 |
| 2018/0029233 A1* | 2/2018 | Lager | B25J 9/1676 |
| 2018/0200965 A1* | 7/2018 | Meess | B25J 9/1682 |
| 2018/0253080 A1* | 9/2018 | Meess | B29C 64/393 |

FOREIGN PATENT DOCUMENTS

| | | |
|---|---|---|
| JP | 11-347984 A | 12/1999 |
| JP | 2013-218644 | 10/2013 |
| JP | 2014-123227 | 7/2014 |
| JP | 2018-020413 A | 2/2018 |

\* cited by examiner

FIG. 3

FITTING TASK

| ACTOR = PERSON | |
|---|---|
| FITTING TYPE OF TASK | ONE-ARM TASK |

| ACTIONS | TIME |
|---|---|
| GRAB | 2 SECONDS |
| FIT | 3 SECONDS |

TOOLS

| ACTOR = ROBOT SYSTEM | | |
|---|---|---|
| FITTING TYPE OF TASK | ONE-ARM TASK | |

| ACTIONS | TIME | INTERFERENCE |
|---|---|---|
| Move | 1 SECOND | YES |
| Pick | 2 SECONDS | NO |
| Transfer | 1 SECOND | YES |
| Place | 3 SECONDS | YES |
| MoveHome | 1 SECOND | NO |

TOOLS

FIG. 6
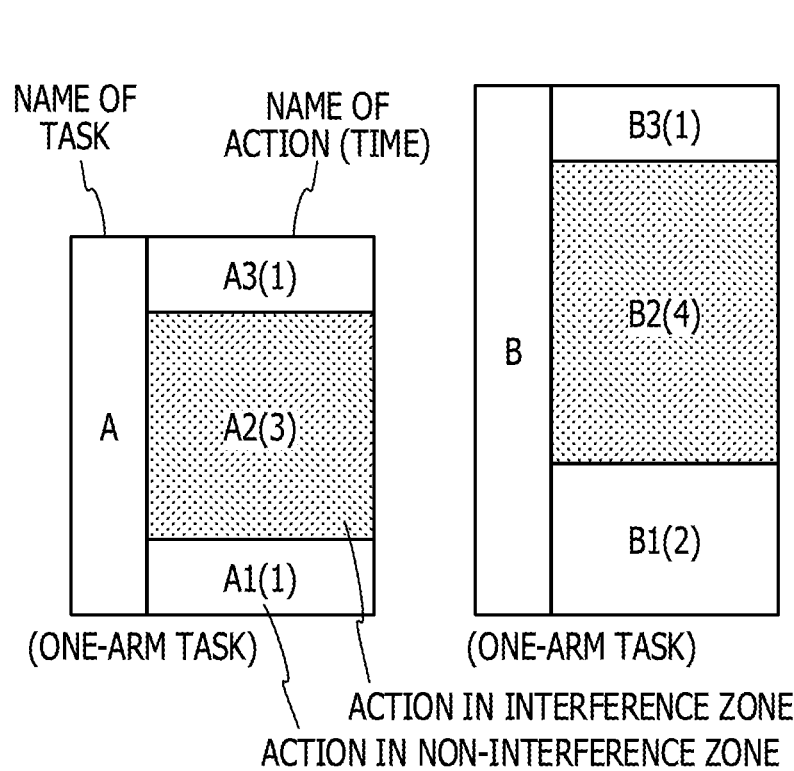
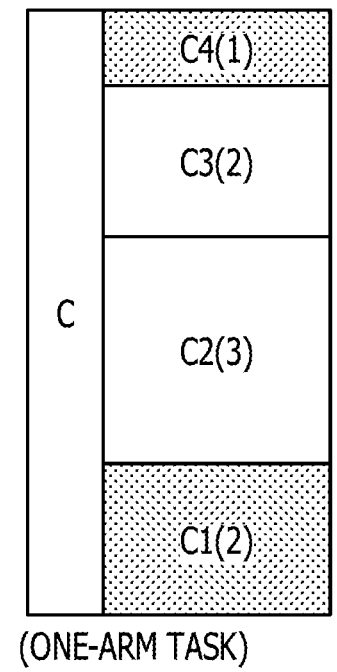
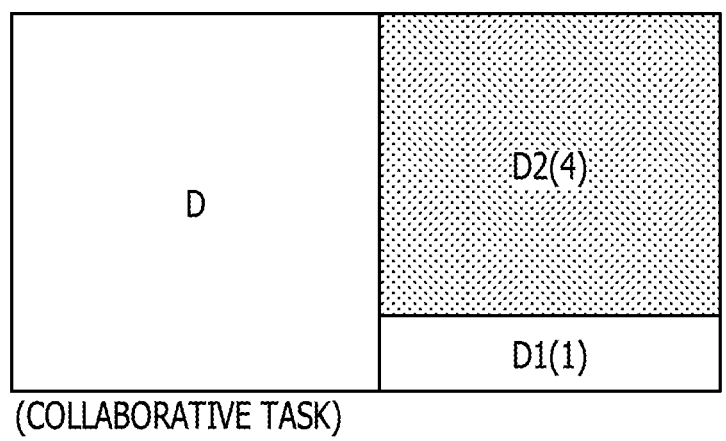
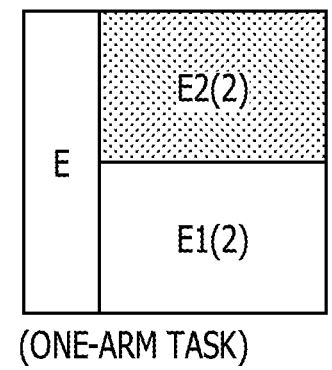

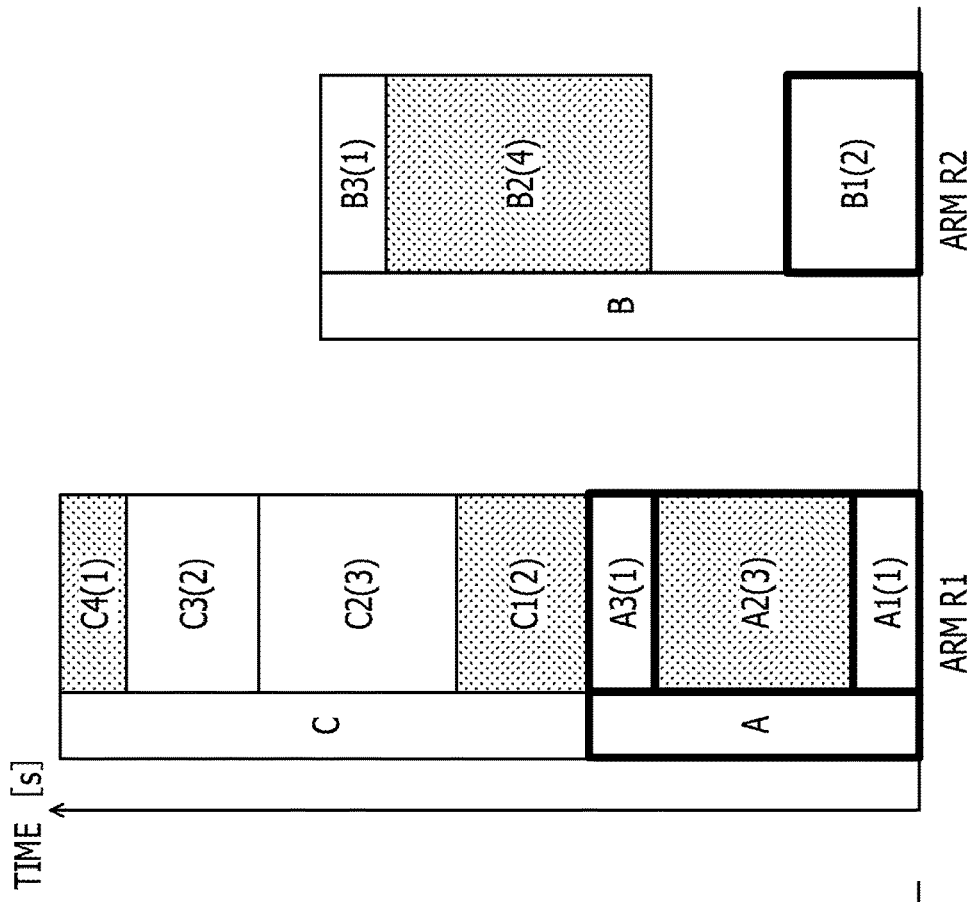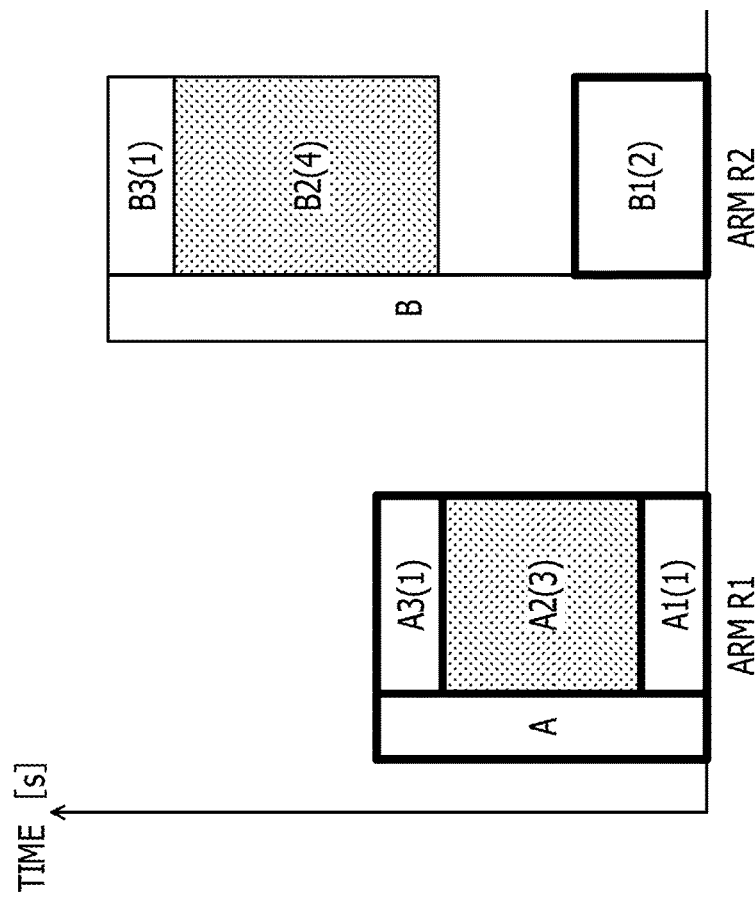

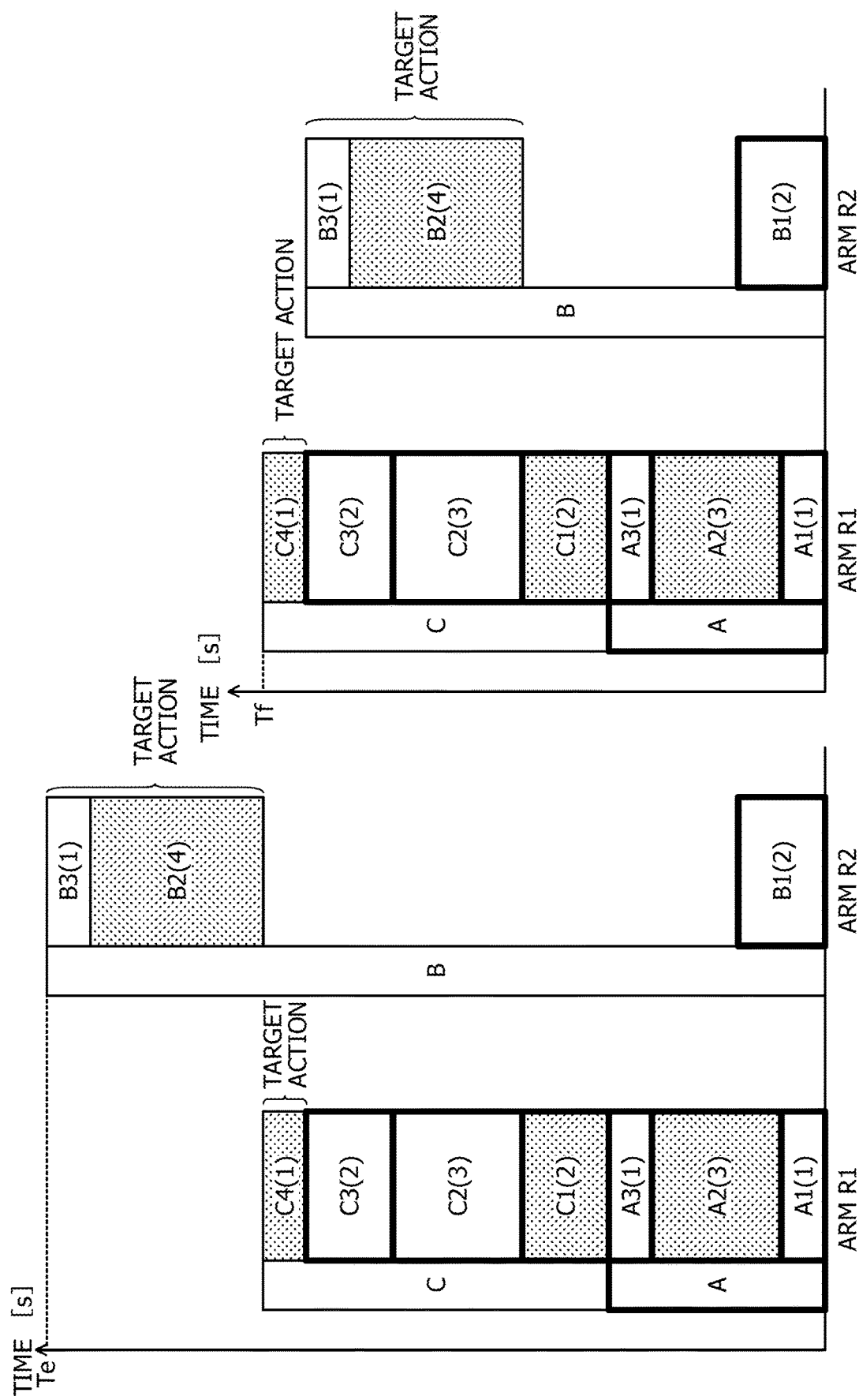

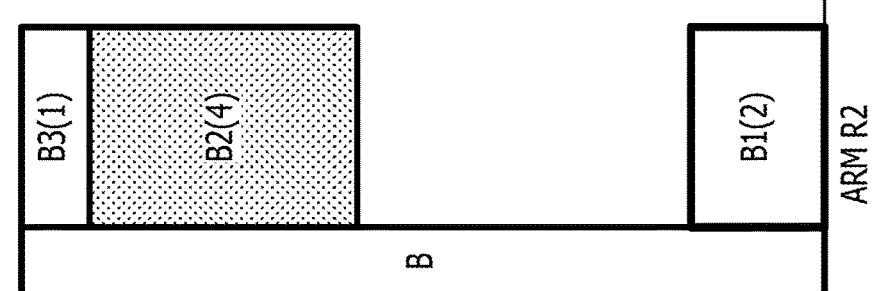
FIG. 13A
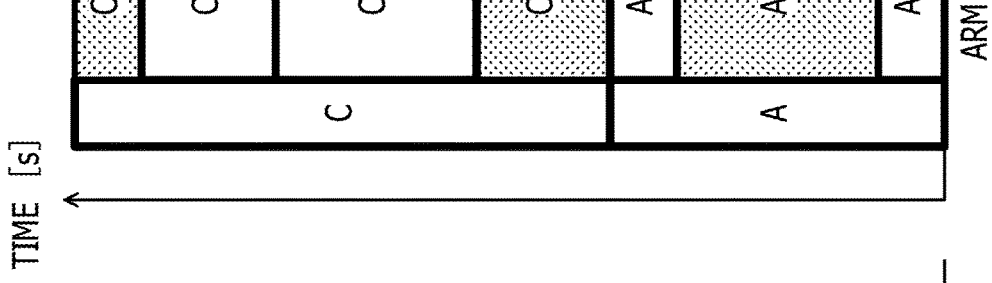
FIG. 13B
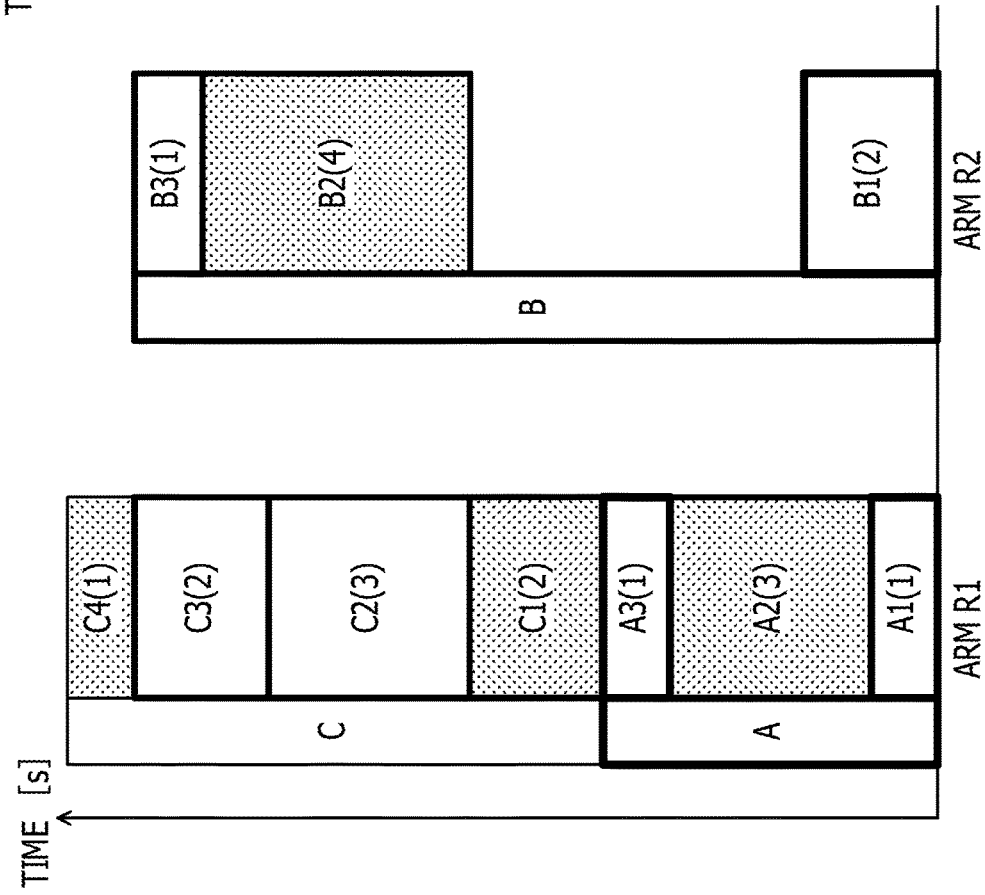

TASK PLANNING APPARATUS, TASK PLANNING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2018-107788, filed on Jun. 5, 2018, the entire contents of which are incorporated herein by reference.

FIELD

The embodiment discussed herein is related to a task planning apparatus, a task planning method, and a non-transitory computer-readable storage medium.

BACKGROUND

Task organization (task planning) for assigning tasks to processes in an assembly line to assemble products is usually optimized in light of compliance with task sequences as well as task leveling in the processes and so forth. Such optimization processing is hard to achieve by hand work. For this reason, an information processing apparatus assigns tasks to persons (workers) and automated machines such as robots by using various algorithms, and presents workloads of the respective tasks to a planner by using a load histogram (a workload chart).

When a general-purpose robot system is used in line production, the information processing apparatus has to adjust not only loads on persons but also a load balance between the persons and robots because there are many types and a large amount of tasks to be carried out by the robots. Assembly tasks including complicated processes such as cable forming as represented by assembly tasks for a notebook personal computer (PC) may involve tasks that require two or more arms (collaborative tasks) and tasks that only require one arm (one-arm tasks) at the same time. Accordingly, the information processing apparatus requires to organize the tasks while taking this point into account as well.

Examples of the related art include Japanese Laid-open Patent Publication Nos. 10-039909, 2013-218644, 11-134392, and 2014-123227.

SUMMARY

According to an aspect of the embodiments, an apparatus includes: a memory; and a processor coupled to the memory, the processing being configured to execute judgment processing that includes judging whether or not a site to carry out a first task assigned to a first robot and a site to carry out a second task assigned to a second robot are likely to overlap each other, execute comparison processing that includes comparing first end time with second end time when the sites to carry out the first task and the second task are likely to overlap each other, the first end time being end time of all of the first and second tasks when adopting a first task order to delay the first task in order to avoid the overlap of the sites to carry out the first task and the second task, and the second end time being end time of all of the first and second tasks when adopting a second task order to delay the second task in order to avoid the overlap of the sites to carry out the first task and the second task, and execute determination processing that includes selecting the first task order when the first end time is earlier than the second end time, and selecting the second task order when the second end time is earlier than the first end time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a task database;

FIG. 6 is a diagram illustrating tasks stored in a task list;

FIGS. 9A and 9B are a third set of diagrams for explaining the processing in FIG. 5;

FIGS. 12A and 12B are a sixth set of diagrams for explaining the processing in FIG. 5;

FIGS. 13A and 13B are a seventh set of diagrams for explaining the processing in FIG. 5;

DESCRIPTION OF EMBODIMENTS

When the complicated assembly tasks as described above are carried out by using a general-purpose robot system, the information processing apparatus has to assign one-arm tasks to respective arms that are arranged close to one another and to assign each of collaborative tasks to two or more arms. The information processing apparatus also has to determine the order of the tasks assigned to the arms in order not to cause interferences among the arms or needless suspension of actions. Though it is possible to use optimization calculation in order to determine the appropriate order of tasks, the optimization calculation involves a large amount of calculations and may require a long time to accomplish the processing.

An object of an aspect of an embodiment discussed herein is to provide an information processing apparatus, a task planning program, and a task planning method which are capable of determining an appropriate order of tasks assigned to two robots in a short time.

An embodiment of an information processing apparatus is described below in detail with reference to FIGS. 1 to 16. An information processing apparatus 10 of this embodiment is an apparatus which creates a task plan (a plan for assigning tasks to persons and robot systems) in an assembly line that involves the persons and the robot systems, and to display information concerning the task plan.

In this embodiment, the assembly line conveys a product from a site for one process to a site for another process by using a belt conveyor (not illustrated) and the like. A person or a robot system is deployed at the site for each process. The person or the robot system deployed at the site for each process produces the product by carrying out a task which is assigned in accordance with the task plan on the product conveyed in the assembly line. The numbers of the persons and the robot systems are optional. Accordingly, one robot system or two or more robot systems may be provided.

Figure 1:
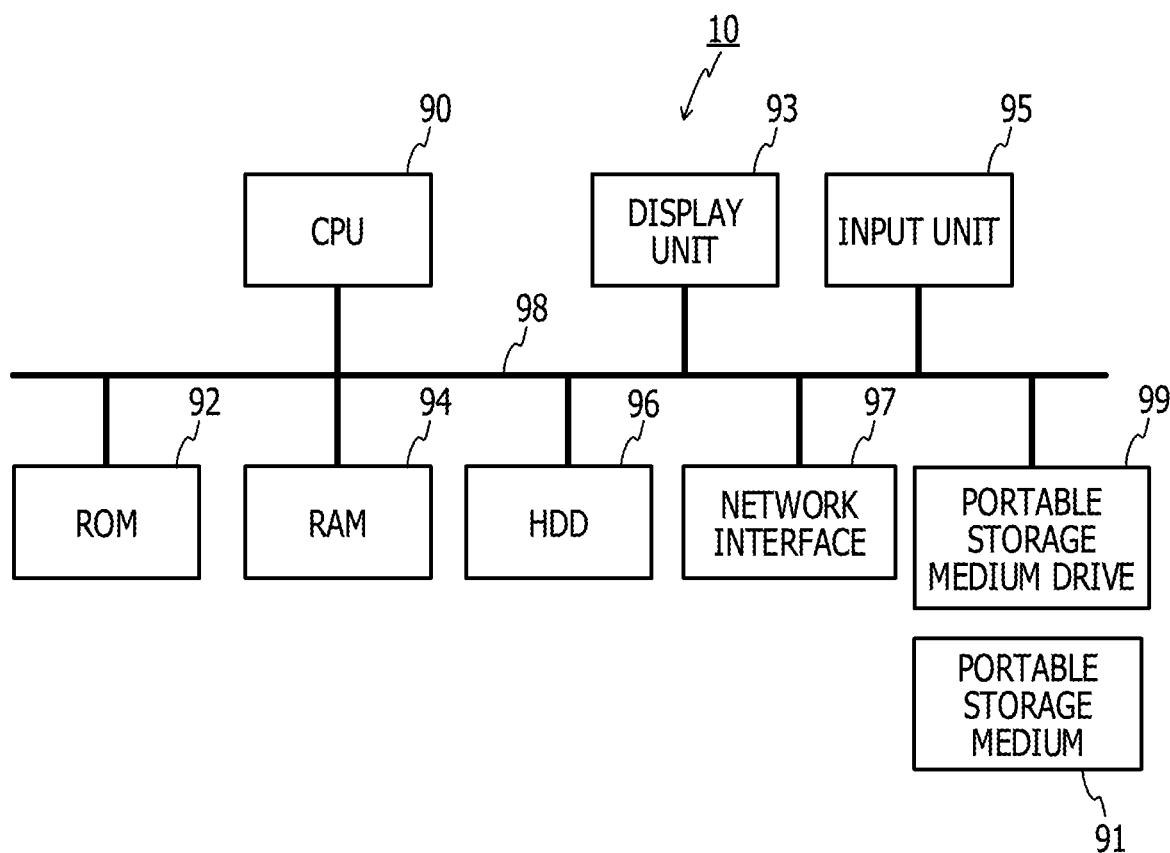
FIG. 1 is a diagram illustrating a hardware configuration of an information processing apparatus according to an embodiment.

FIG. 1 illustrates a hardware configuration of the information processing apparatus 10. The information processing apparatus 10 is a personal computer (PC), for instance, which includes a central processing unit (CPU) 90 serving as a computer, a read only memory (ROM) 92, a random access memory (RAM) 94, a storage unit (which is a hard disk drive (HDD) in this case) 96, a network interface 97, a portable storage medium drive 99, a display unit 93, an input unit 95, and the like as illustrated in FIG. 1. The display unit 93 includes a liquid crystal display unit and the like while the input unit 95 includes a keyboard, a mouse, a touch panel, and the like. These constituents of the information processing apparatus 10 are connected to a bus 98. The information processing apparatus 10 realizes functions of units illustrated in FIG. 2 by causing the CPU 90 to execute programs (including a task planning program) stored in the ROM 92 or the HDD 96, or programs (including the task planning program) read out of a portable storage medium 91 by using the portable storage medium drive 99. Note that the portable storage medium 91 is any of a portable storage medium such as a CD-ROM, a DVD, and a Universal Serial Bus (USB) memory, a semiconductor memory such as a flash memory, and the like. Alternatively, the functions of the units in FIG. 2 may be realized by an integrated circuit such as an application specific integrated circuit (ASIC) and a field programmable gate array (FPGA).

Figure 2:
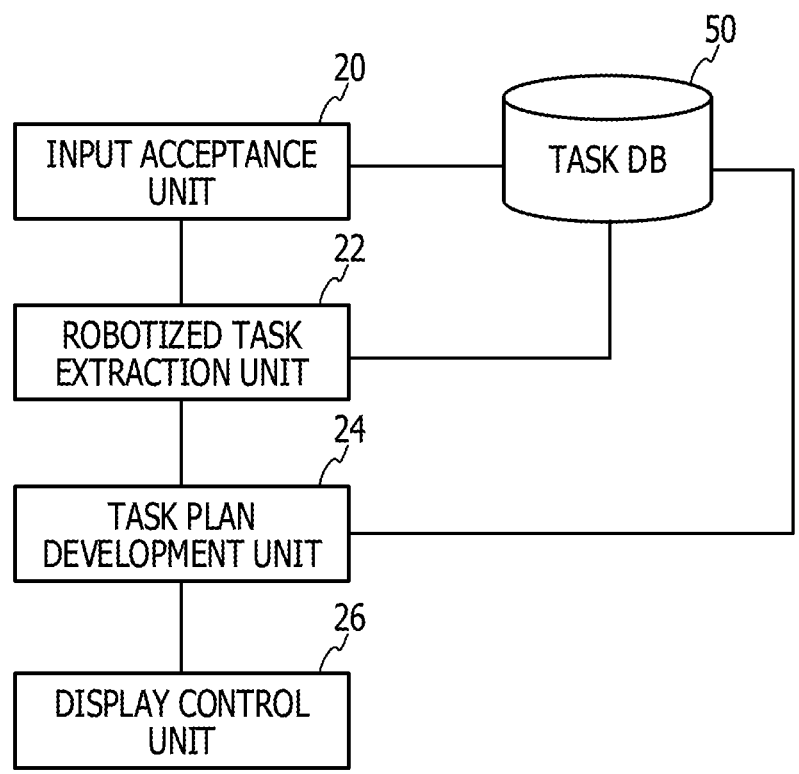
FIG. 2 is a functional block diagram of the information processing apparatus.

FIG. 2 illustrates a functional block diagram of the information processing apparatus 10. As illustrated in FIG. 2, the information processing apparatus 10 functions as an input acceptance unit 20, a robotized task extraction unit 22, a task plan development unit 24, and a display control unit 26 as a consequence of execution of the relevant programs by the CPU 90.

The input acceptance unit 20 accepts information on tasks that require to be carried out in the assembly line, which is inputted by a planner of the task plan through the input unit 95. The input acceptance unit 20 stores the accepted information in a task DB 50. The task DB 50 is a database that stores information on respective tasks as illustrated in FIG. 3. Each task involves one or more actions. The information on each task contains information on the actions, types of the tasks, information on required tools, and the like regarding a case where the person carries out the task (where an actor is the person) and a case where the robot system carries out the task (where the actor is the robot system), respectively. In the case of a "fitting task" illustrated in FIG. 3, for example, the type of the task is the one-arm task and the actions include "grab" and "fit" when the actor is the person. Time required for the task (a total action time) is 5 seconds. On the other hand, when the actor is the robot system, the type of the task is the one-arm task and the actions include "Move", "Pick", "Transfer", "Place", and "MoveHome". Time required for the task is 8 seconds. Among the actions of the robot system, the actions "Move", "Transfer", and "Place" are actions in an "interference zone" to be described later (such actions are referred to as interference actions) while the actions "Pick" and "MoveHome" are actions in a "non-interference zone" to be described later (such actions are referred to as non-interference actions).

Figure 4:
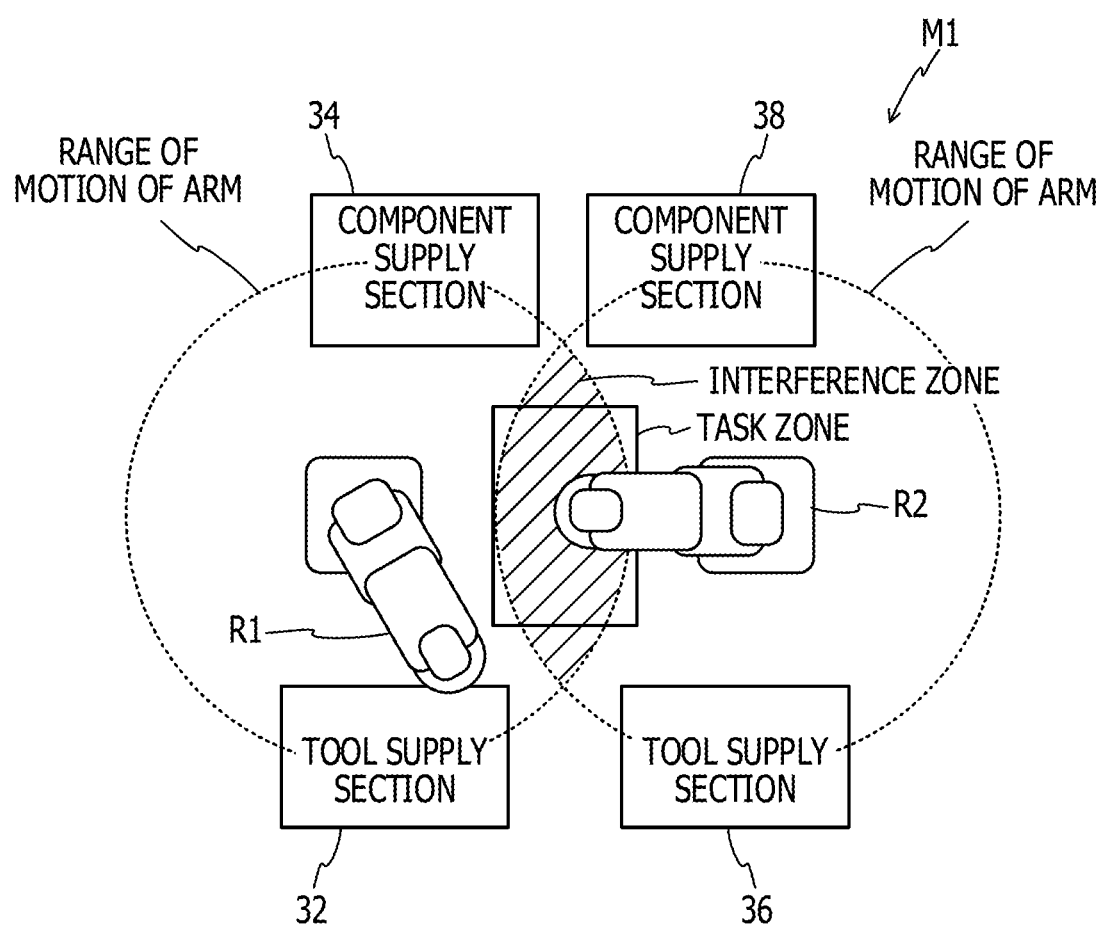
FIG. 4 is a diagram illustrating a robot system according to the embodiment.

As the robot system, this embodiment assumes to use a robot system M1, which includes two arms R1 and R2 serving as first and second robots as illustrated in FIG. 4. A tool supply section 32 and a component supply section 34 are provided in a range of motion of the arm R1 while a tool supply section 36 and a component supply section 38 are provided in a range of motion of the arm R2. Tools to be used by the arms R1 and R2 are changed at the tool supply sections 32 and 36. The arms R1 and R2 execute the action to pick up components (the action "Pick") at the component supply sections 34 and 38. The arms R1 and R2 carry out the tasks either independently or collaboratively in a task zone illustrated in FIG. 4. In this embodiment, the ranges of motion of the arms R1 and R2 partially overlap each other because the arms R1 and R2 may sometimes carry out the task in collaboration. Such an overlapping zone constitutes the "interference zone" where the arms R1 and R2 are likely to interfere with each other while the ranges of the motion of the arms other than the interference zone constitute the "non-interference zone". In this embodiment, while one of the arms performs the one-arm task (the task which is not the collaborative task) in the interference zone, the other arm is supposed to perform a non-interference action or to stand by in the non-interference zone in order to avoid a collision of the arms.

The robotized task extraction unit 22 extracts the task to be assigned to the robot system out of the tasks to be carried out in the assembly line. For example, the robotized task extraction unit 22 extracts the task to be assigned to the robot system depending on a positional relation between the person and the robot system in the assembly line, the information in the task DB 50 (such as information as to whether or not each of the tasks is assignable to the robot system), and the like.

The task plan development unit 24 develops the task plan by assigning the tasks to the persons and the robot systems deployed at the sites for the respective processes in the assembly line while using results of extraction by the robotized task extraction unit 22. In this instance, the task plan development unit 24 assigns the tasks to the persons and the robot systems by using local search such as tabu search and simulated annealing while taking various evaluation indices into account. For example, the evaluation indices include parameters to indicate variations in time among the processes, whether or not the same tools are consolidated in particular processes, whether or not the processes are in accordance with a predetermined order of priority, whether or not the tasks violate sequence restrictions, and so forth. The task plan development unit 24 determines the assignment of the tasks by repeating a set of tentative determination of the assignment and relevant calculation of the evaluation indices in each tentative task assignment. In a case of a robotized process, the evaluation indices are calculated after the task plan is developed. When the task plan development unit 24 develops the task plan, the task plan development unit 24 assigns the tasks (the actions) to the respective arms R1 and R2 so as to minimize task time for the tasks assigned to the robot system, and thus determines the order of execution of the tasks (namely, start time of each task (action)). In this case, the task plan development unit 24 takes into account whether each task assigned to the robot system is the one-arm task or the collaborative task that involves two arms R1 and R2, and whether each action is the interference action or the non-interference action.

The display control unit 26 creates a display screen based on the task plan developed by the task plan development unit 24 and causes the display unit 93 to display the created display screen.

(Regarding Processing to Determine Start Time of Each Action in Robot System)

Figure 5:
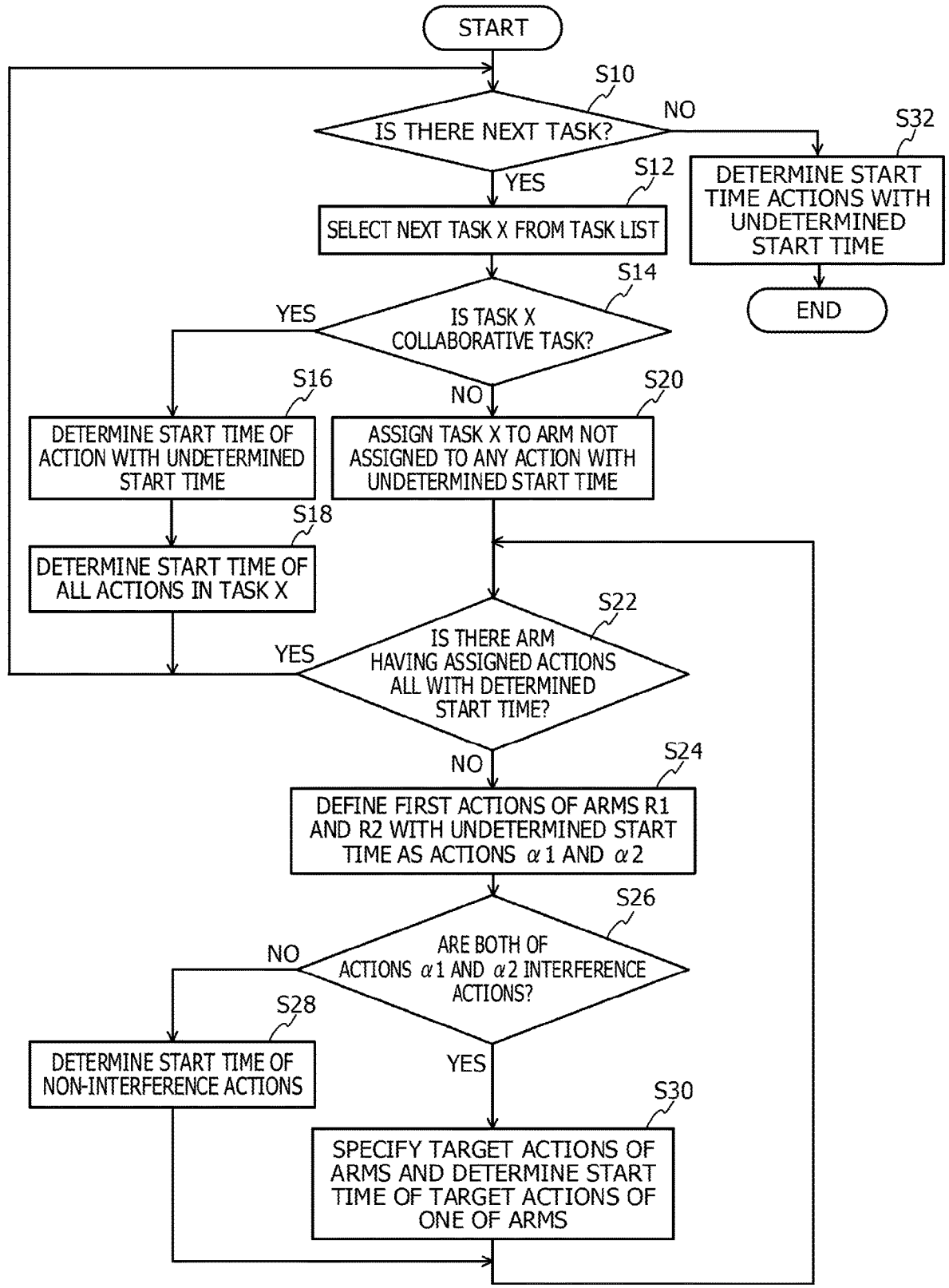
FIG. 5 is a flowchart illustrating processing to determine start time of each action in a robot system, which is to be determined by a task plan development unit.

Next, processing to determine start time of each action in the robot system, which is to be executed by the task plan development unit 24 in the course of development of the task plan, is described in detail along with a flowchart in FIG. 5 and with reference to other drawings as appropriate.

FIG. 5 is a flowchart illustrating the processing to determine the start time of each action in the robot system by using the task plan development unit 24. This processing is conducted on the assumption that the task plan development unit 24 has completed assignment of the tasks to the sites of the respective processes (to the persons and the robot systems) in the assembly line in advance. The information on the tasks assigned to each of the robot systems is stored in a task list. This embodiment assumes that the following tasks A to E as illustrated in FIG. 6 are stored in the task list, for example. Note that the order of assignment of the tasks A to E is assumed to be A→B→C→D→E.

The task A is the one-arm task that includes actions A1, A2, and A3 which require 1 second, 3 seconds, and 1 second, respectively. Of the actions A1 to A3, the actions A1 and A3 are the actions in the non-interference zone whereas the action A2 is the action in the interference zone. The actions included in each task in FIG. 6 are assumed to be executed from bottom up (in the order of the actions A1→A2→A3 in the case of the task A).

The task B is the one-arm task that includes actions B1, B2, and B3 which require 2 seconds, 4 seconds, and 1 second, respectively. Of the actions B1 to B3, the actions B1 and B3 are the actions in the non-interference zone whereas the action B2 is the action in the interference zone. The task C is the one-arm task that includes actions C1, C2, C3, and C4 which require 2 seconds, 3 seconds, 2 seconds, and 1 second, respectively. Of the actions C1 to C4, the actions C1 and C4 are the actions in the interference zone whereas the actions C2 and C3 are the actions in the non-interference zone. The task D is the collaborative task that includes actions D1 and D2 which require 1 second and 4 seconds, respectively. Of the actions D1 and D2, the action D1 is the action in the non-interference zone whereas the action D2 is the action in the interference zone. The task E is the one-arm task that includes actions E1 and E2 which require 2 seconds and 2 seconds, respectively. Of the actions E1 and E2, the action E1 is the action in the non-interference zone whereas the action E2 is the action in the interference zone. Each of the tasks in FIG. 6 is actually the "fitting task" in FIG. 3 or the like and the respective actions are actually the actions "Move", "Pick", "Transfer" and the like in FIG. 3. However, the tasks and the actions are indicated with alphabets for simplicity of explanation.

The task plan development unit 24 assigns the respective tasks in FIG. 6, which are assigned to the robot system, further to the arms R1 and R2 by executing the processing in FIG. 5. The task plan development unit 24 also determines the start time of each of the actions by determining the order of execution of the actions of the respective arms.

In the processing of FIG. 5, the task plan development unit 24 first determines whether or not there is the next task in step S10. When the determination in Step S10 is affirmative, the task plan development unit 24 proceeds to step S12.

In step S12, the task plan development unit 24 selects the next task X from the task list (FIG. 6). Here, the task plan development unit 24 is assumed to select the task A.

In the next step S14, the task plan development unit 24 determines whether or not the task X (=the task A) is the collaborative task. In this case, the task A is not the collaborative task but is the one-arm task. Accordingly, the determination in step S14 is negative and the task plan development unit 24 proceeds to step S20.

Figure 7A:
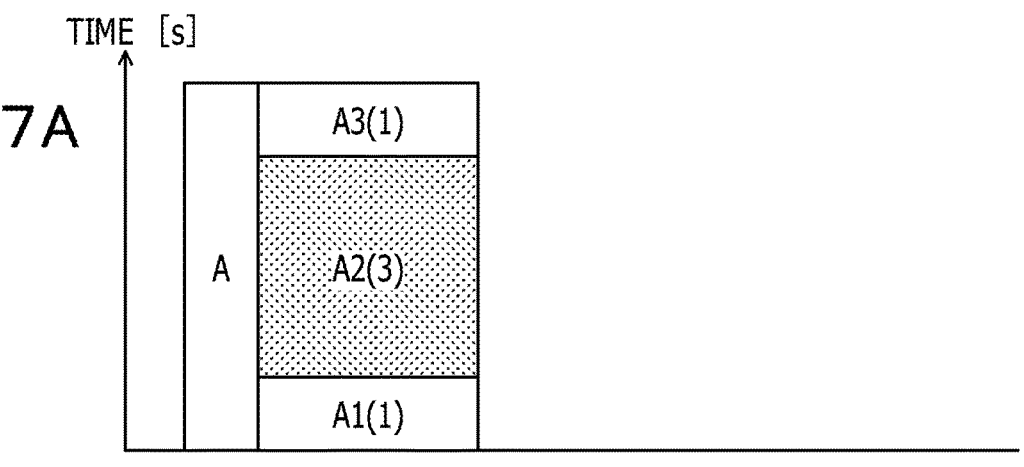
FIGS. 7A to 7C are a first set of diagrams for explaining the processing in FIG. 5.

In step S20, the task plan development unit 24 assigns the task X to an arm that is not assigned to any action with undetermined start time. Since no tasks are assigned to the arm R1 or the arm R2 at this stage, the task plan development unit 24 assigns the task A to the arm R1 as illustrated in FIG. 7A, for example. When both of the arms R1 and R2 are the arms that are not assigned to actions with undetermined start time, the task plan development unit 24 may assign the task to one of the arms based on a predetermined rule. For example, the task plan development unit 24 may assign the task to an arm having a higher priority that is determined in advance, or to an arm that has been assigned to fewer tasks so far. FIG. 7A is a graph illustrating the start time of the tasks (the actions) assigned to the respective arms and the time required for the tasks (the actions). FIG. 7A indicates that the tasks (the actions) are executed from bottom up in the graph. Note that FIG. 7A illustrates a state in which the start time of the task A (the actions A1 to A3) is yet to be determined. When the start time of the tasks (the actions) is determined, the relevant tasks and actions are supposed to be indicated with thick frames as seen in the task A and the actions A1 to A3 and B1 in FIG. 9A, for instance.

Back in FIG. 5, in the next step S22, the task plan development unit 24 determines whether or not there is a robot which has the assigned actions all with the determined start time. Although no tasks are assigned to the arm R2 in the state of FIG. 7A, this may also be regarded as a state in which the start time of all of the actions assigned to the arm R2 is determined. Accordingly, the determination in step S22 is affirmative. The task plan development unit 24 returns to step S10 when the determination in step S22 is affirmative.

Back in step S10, the task plan development unit 24 determines whether or not there is the next task. When the determination is affirmative, the task plan development unit 24 proceeds to step S12. In step S12, the task plan development unit 24 selects the task B from the task list of the FIG. 6 as the next task X.

In the next step S14, the task plan development unit 24 determines whether or not the task X (=the task B) is the collaborative task. When the determination in step S14 is negative, the task plan development unit 24 proceeds to step S20 and assigns the task B to the arm (R2) that is not assigned to any action with undetermined start time (see FIG. 7B).

In the next step S22, the task plan development unit 24 determines whether or not there is a robot which has the assigned actions all with the determined start time. In this case, neither the arm R1 nor the arm R2 is the one that has the assigned actions all with the determined start time. Accordingly, the determination in step S22 is negative and the task plan development unit 24 proceeds to step S24.

Figure 7B:
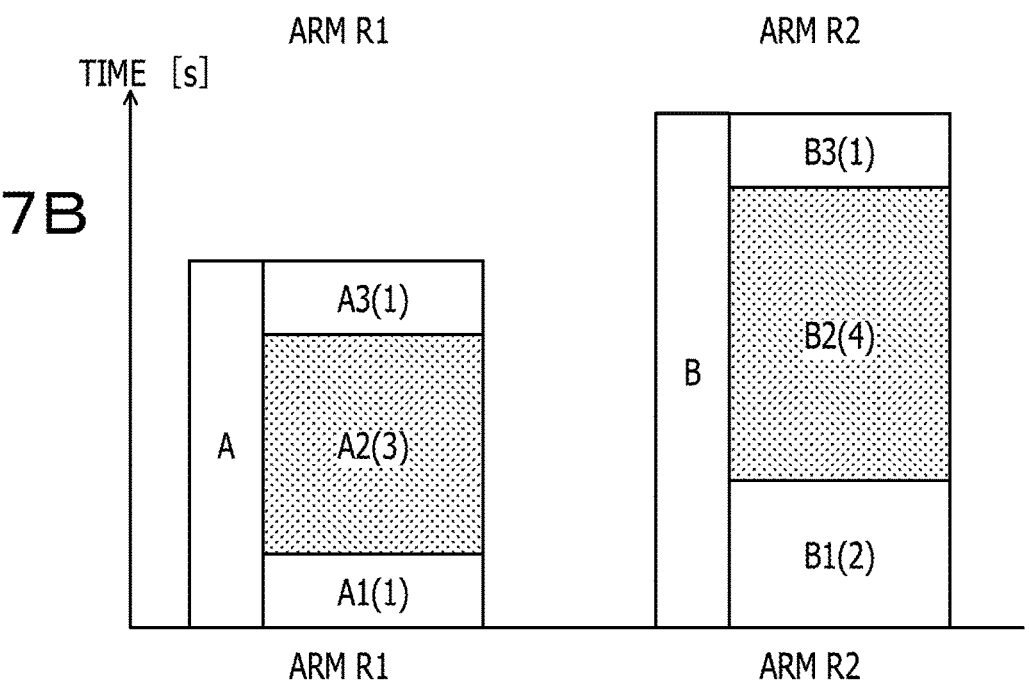

In step S24, the task plan development unit 24 defines first actions of the arms R1 and R2 with undetermined start time as actions α1 and α2. In this case, the actions A1 and B1 in FIG. 7B are defined as the actions α1 and α2, respectively.

In the next step S26, the task plan development unit 24 determines whether or not both of the actions α1 and α2 (=A1 and B1) are the interference actions. This step S26 may be regarded as the determination as to whether or not target actions of the arms R1 and R2 to be described later are likely to interfere with each other. In the case of FIG. 7B, both of the actions A1 and B1 are the non-interference actions. Accordingly, the determination in step S26 is negative and the task plan development unit 24 proceeds to step S28.

In step S28, the task plan development unit 24 determines the start time of the non-interference actions. In this case, the task plan development unit 24 determines the start time of the actions A1 and B1 as indicated with thick frames in FIG. 7C. Then, the task plan development unit 24 returns to step S22.

Figure 7C:
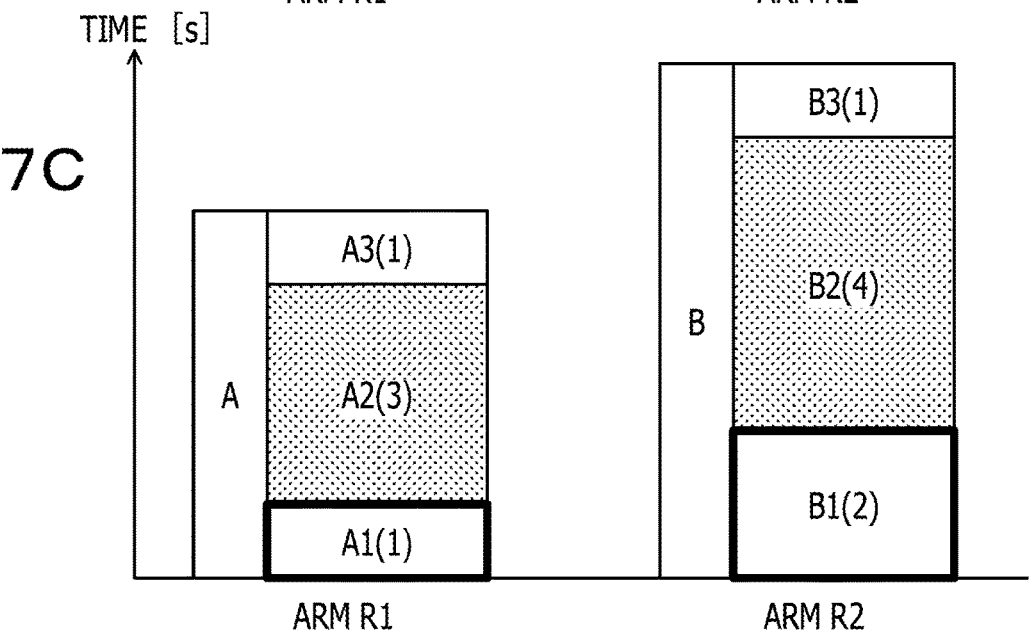

Back in step S22, the task plan development unit 24 determines whether or not there is an arm which has the assigned actions all with the determined start time. In the case of FIG. 7C, there are no arms having the assigned actions all with the determined start time. Accordingly, the determination in step S22 is negative and the task plan development unit 24 proceeds to step S24. In step S24, the task plan development unit 24 defines the actions A2 and B2 of the arms R1 and R2 as the actions α1 and α2. In the next step S26, the task plan development unit 24 determines whether or not both of the actions α1 and α2 (=A2 and B2) are the interference actions. In this case, both of the actions A2 and B2 are the interference actions. Accordingly, the determination in step S26 is affirmative and the task plan development unit 24 proceeds to step S30.

In step S30, the task plan development unit 24 specifies the following actions as target actions, namely, actions to take place before the next interference action comes up after the non-interference actions that are subsequent to the earlier interference action. The task plan development unit 24 also calculates completion time (end time) of all of the target actions regarding two types of the order of execution, namely, one in which the target actions of the arm R1 are executed earlier and one in which the target actions of the arm R2 are executed earlier. The task plan development unit 24 compares calculation results of the completion time between the two types, and adopts the order of execution that has the earlier completion time. The task plan development unit 24 determines the start time of the target actions of the arm used in the order of execution that has the earlier completion time.

In the example of FIG. 7C, there are no interference actions after the non-interference action A3 subsequent to the action A2, and there are no interference actions after the non-interference action B3 subsequent to the action B2. The task plan development unit 24 therefore specifies the actions A2 and A3 of the arm R1 as well as the actions B2 and B3 of the arm R2 as the target actions. The task plan development unit 24 calculates the completion time of all of the target actions in the case of starting the target actions A2 and A3 earlier and the completion time of all of the target actions in the case of starting the target actions B2 and B3 earlier, and compares calculation results with each other.

Figure 8A:
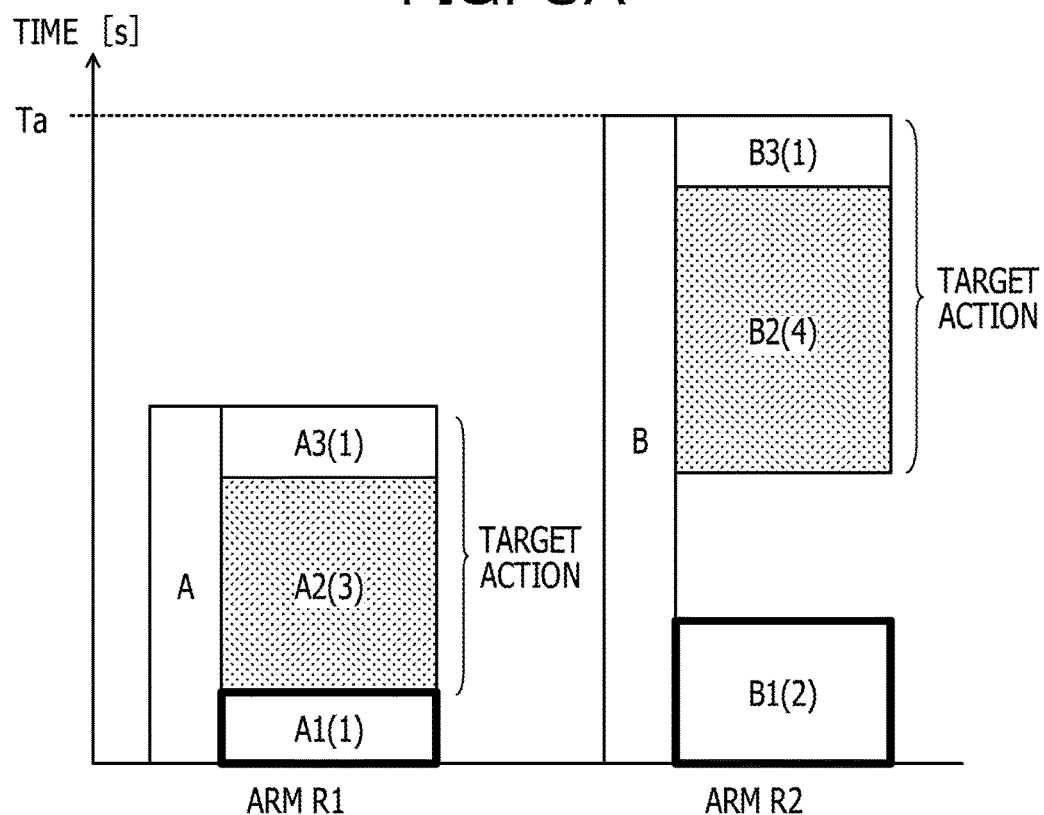
FIGS. 8A and 8B are a second set of diagrams for explaining the processing in FIG. 5.
Figure 8B:
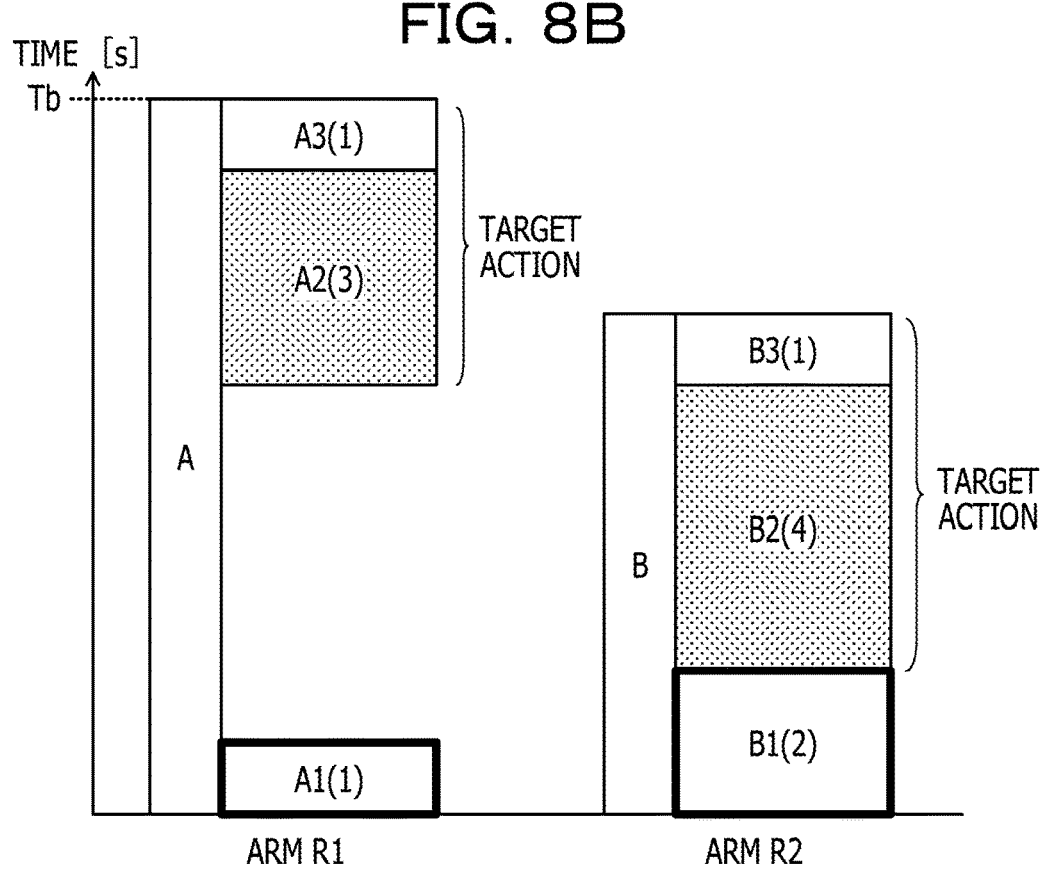

In this case, the task plan development unit 24 calculates completion time Ta of all of the target actions in the case of starting the target actions A2 and A3 earlier as illustrated in FIG. 8A and completion time Tb of all of the target actions in the case of starting the target actions B2 and B3 earlier as illustrated in FIG. 8B, and then compares the completion time Ta with the completion time Tb. In this instance, the task plan development unit 24 prohibits simultaneous execution of the interference actions of both of the arms, but allows simultaneous execution of the interference action of one of the arms and the non-interference action of the other arm.

In the example of FIGS. 8A and 8B, the completion time Ta of all of the target actions in FIG. 8A is earlier than the completion time Tb of all of the target actions in FIG. 8B. Accordingly, the task plan development unit 24 adopts the order of execution illustrated in FIG. 8A and determines the start time of each of the target actions A2 and A3 of the arm R1 out of the arms R1 and R2, which has the earlier completion time (see the thick frames in FIG. 9A). In FIG. 9A, a frame representing the task A is also indicated with a thick frame because the start time of all of the actions included in the task A has been determined.

In the examples of FIGS. 8A and 8B, it is possible to regard the target actions A2 and A3 assigned to the arm R1 as a first task and the target actions B2 and B3 assigned to the arm R2 as a second task. Step S30 may be regarded as the processing to compare the task completion time in the case of delaying the first task (the case of a first task order) for the purpose of avoiding an overlap of the site to carry out the first task (the target actions A2 and A3) and the site to carry out the second task (the target actions B2 and B3) with the task completion time in the case of delaying the second task (the case of a second task order) for the same purpose, and then to adopt the task order that has the earlier completion time.

The task plan development unit 24 returns to step S22 after the processing in step S30 is executed as described above. Back in step S22, the task plan development unit 24 determines whether or not there is an arm having the assigned actions all with the determined start time. In the case of FIG. 9A, all of the actions assigned to the arm R1 have the determined start time. Accordingly, the determination in step S22 is affirmative and the task plan development unit 24 returns to step S10.

Back in step S10, the task plan development unit 24 determines whether or not there is the next task on the task list (FIG. 6). Since there is the next task C, the determination in Step S10 is affirmative and the task plan development unit 24 proceeds to step S12.

In step S12, the task plan development unit 24 selects the task C from the task list as the next task X. In the next step S14, the task plan development unit 24 determines whether or not the task X (=the task C) is the collaborative task. In this case, the task C is not the collaborative task. Accordingly, the determination in step S14 is negative and the task plan development unit 24 proceeds to step S20. In step S20, the task plan development unit 24 assigns the task C to an arm (the arm R1 in this case) which is not assigned to any action with undetermined start time. FIG. 9B illustrates a state in which the task C is assigned to the arm R1.

In the next step S22, the task plan development unit 24 determines whether or not there is an arm which has the assigned actions all with the determined start time. In this case of the FIG. 9B, there are no arms having the assigned actions all with the determined start time. Accordingly, the determination in step S22 is negative and the task plan development unit 24 proceeds to step S24.

In step S24, the task plan development unit 24 defines first actions C1 and B2 of the arms R1 and R2 with undetermined start time as the actions α1 and α2. In the next step S26, the task plan development unit 24 determines whether or not both of the actions α1 and α2 (=C1 and B2) are the interference actions. In this case, both of the actions C1 and B2 are the interference actions. Accordingly, the determination in step S26 is affirmative and the task plan development unit 24 proceeds to step S30.

In step S30, the task plan development unit 24 specifies the target actions of the respective arms and determines the start time of the target actions of one of the arms as described above.

In the example of FIG. 9B, there is the interference action C4 after the non-interference actions C2 and C3 subsequent to the action C1, and there are no interference actions after the non-interference action B3 subsequent to the action B2. The task plan development unit 24 therefore specifies the actions C1, C2, and C3 as well as the actions B2 and B3 as the target actions. The task plan development unit 24 also calculates the completion time of all of the target actions regarding the two types of the order of execution, namely, one in which the target actions of the arm R1 are executed earlier and one in which the target actions of the arm R2 are executed earlier. The task plan development unit 24 compares the calculation results and adopts the order of execution that has the earlier completion time. The task plan development unit 24 determines the start time of the target actions of the arm that completes the target actions earlier.

Figure 10A:
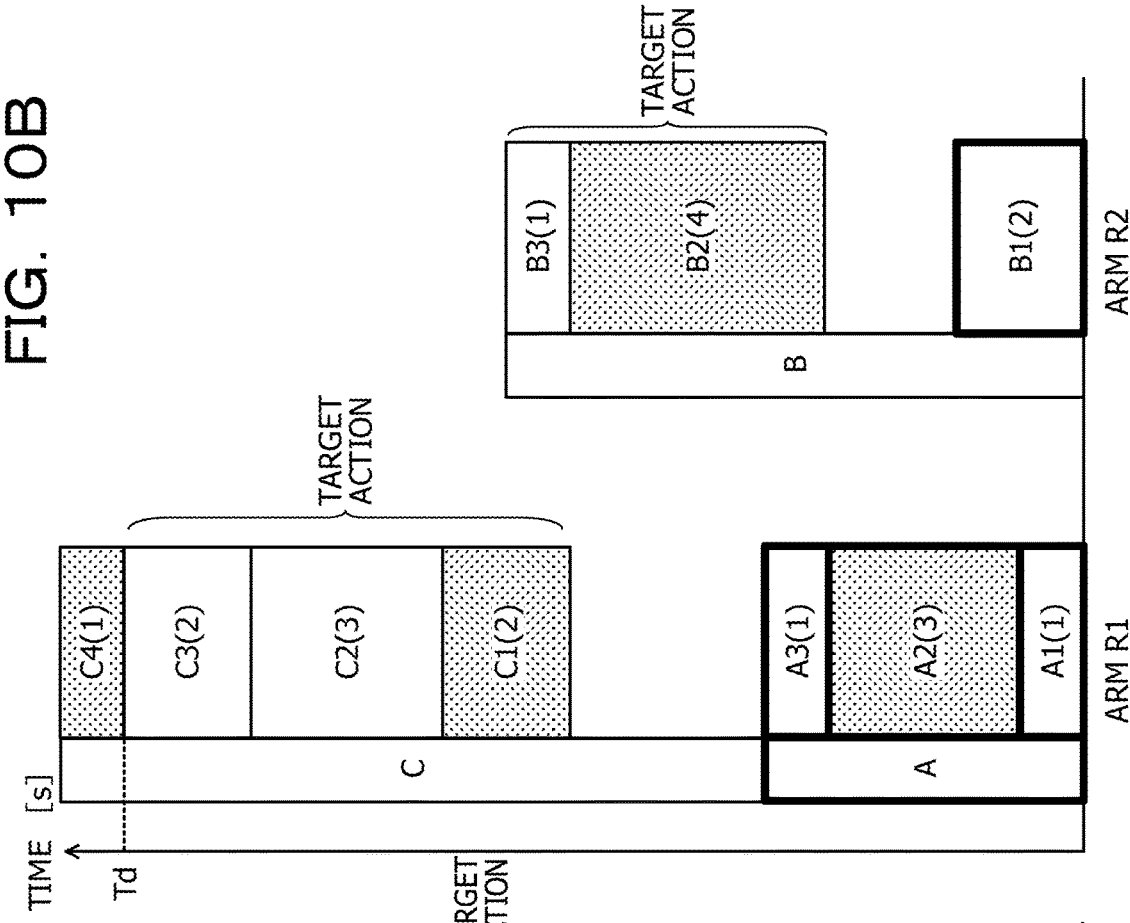
FIGS. 10A and 10B are a fourth set of diagrams for explaining the processing in FIG. 5.
Figure 10B:
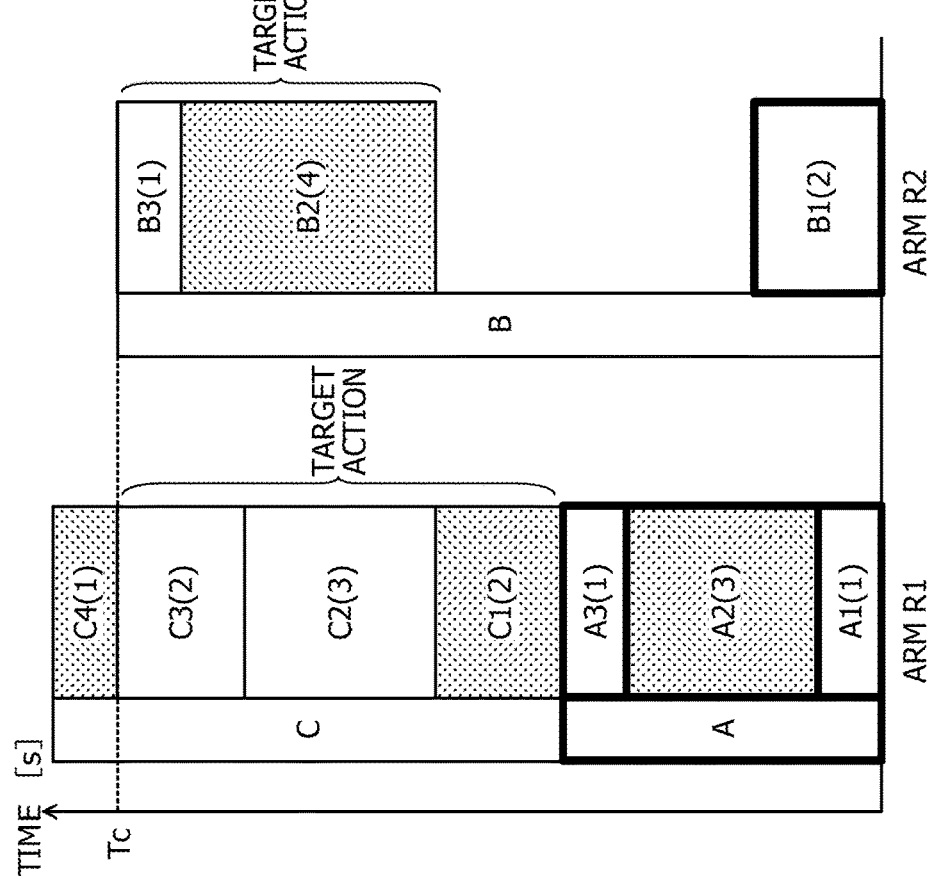

In this case, the task plan development unit 24 calculates completion time Tc of all of the target actions in the case of starting the target actions C1, C2, and C3 of the arm R1 earlier as illustrated in FIG. 10A and completion time Td of all of the target actions in the case of starting the target actions B2 and B3 of the arm R2 earlier as illustrated in FIG. 10B, and then compares the completion time Tc with the completion time Td. In the example of FIGS. 10A and 10B, the completion time Tc in FIG. 10A is earlier than the completion time Td in FIG. 10B. Accordingly, the task plan development unit 24 adopts the order of execution illustrated in FIG. 10A. The task plan development unit 24 then determines the start time of each of the target actions C1, C2, and C3 of the arm R1 out of the arms R1 and R2, which has the earlier completion time (see the thick frames in FIG. 11). Then, the task plan development unit 24 returns to step S22.

Figure 11:
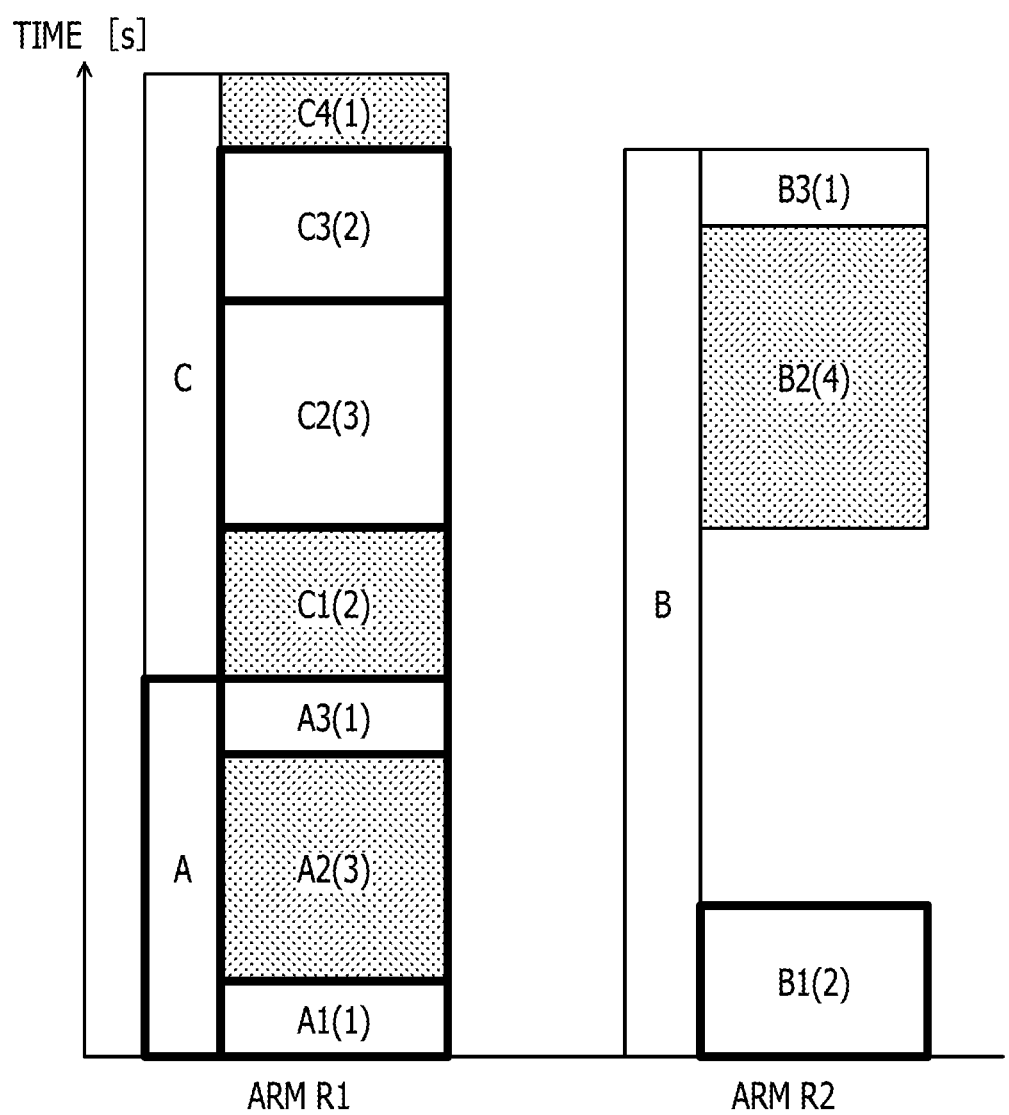
FIG. 11 is a fifth diagram for explaining the processing in FIG. 5.

In step S22, the task plan development unit 24 determines whether or not there is an arm which has the assigned actions all with the determined start time. In FIG. 11, neither the arm R1 nor the arm R2 has the assigned actions all with the determined start time. Accordingly, the determination in step S22 is negative and the task plan development unit 24 proceeds to step S24. In step S24, the task plan development unit 24 defines the actions C4 and B2 of the arms R1 and R2 as the actions α1 and α2. In the next step S26, the task plan development unit 24 determines whether or not both of the actions α1 and α2 (=C4 and B2) are the interference actions. In this case, both of the actions C4 and B2 are the interference actions. Accordingly, the determination in step S26 is affirmative and the task plan development unit 24 proceeds to step S30.

In step S30, the task plan development unit 24 specifies the target actions of the respective arms and determines the start time of the target actions of one of the arms as described above.

In the example of FIG. 11, there are no interference actions after the action C4 and there are no interference actions after the non-interference action B3 subsequent to the action B2. The task plan development unit 24 therefore specifies the action C4 as well as the actions B2 and B3 as the target actions. The task plan development unit 24 then calculates the completion time of all of the target actions in the case of starting the target action C4 earlier and the completion time of all of the target actions in the case of starting the target actions B2 and B3 earlier, and compares calculation results with each other.

In this case, the task plan development unit 24 compares completion time Te of all of the target actions in the case of starting the target action C4 earlier as illustrated in FIG. 12A with completion time Tf of all of the target actions in the case of starting the target actions B2 and B3 earlier as illustrated in FIG. 12B. In the case of FIG. 12B, it is possible to carry out the interference action B2 at the same time as the non-interference actions C2 and C3. Accordingly, it is possible to start the interference action B2 immediately after the execution of the action C1. In the example of FIGS. 12A and 12B, the completion time Tf in FIG. 12B is earlier than the completion time Te in FIG. 12A. Accordingly, the task plan development unit 24 adopts the order of execution in FIG. 12B and determines the start time of each of the target actions B2 and B3 of the arm R2 out of the arms R1 and R2, which has the earlier completion time (see the thick frames in FIG. 13A). Then, the task plan development unit 24 returns to step S22.

Back in step S22, the task plan development unit 24 determines whether or not there is an arm which has the assigned actions all with the determined start time. In the case of FIG. 13A, the arm R2 has the assigned actions all with the determined start time. Accordingly, the determination in step S22 is affirmative and the task plan development unit 24 returns to step S10. Back in step S10, the task plan development unit 24 determines whether or not there is the next task on the task list (FIG. 6). Since there is the next task D, the determination in step S10 is affirmative and the task plan development unit 24 proceeds to step S12.

In step S12, the task plan development unit 24 selects the task D from the task list as the next task X. In the next step S14, the task plan development unit 24 determines whether or not the task D is the collaborative task. In this case, the task D is the collaborative task. Accordingly, the determination in step S14 is affirmative and the task plan development unit 24 proceeds to step S16. In step S16, the task plan development unit 24 determines start time of each action with undetermined start time. In the case of FIG. 13A, the start time of the action C4 is undetermined. Accordingly, the task plan development unit 24 determines the start time of the action C4 as it is in FIG. 13A (see a thick frame around the action C4 in FIG. 13B). In FIG. 13B, a frame representing the task C is also indicated with a thick frame because the start time of all of the actions included in the task C has been determined.

Figure 14:
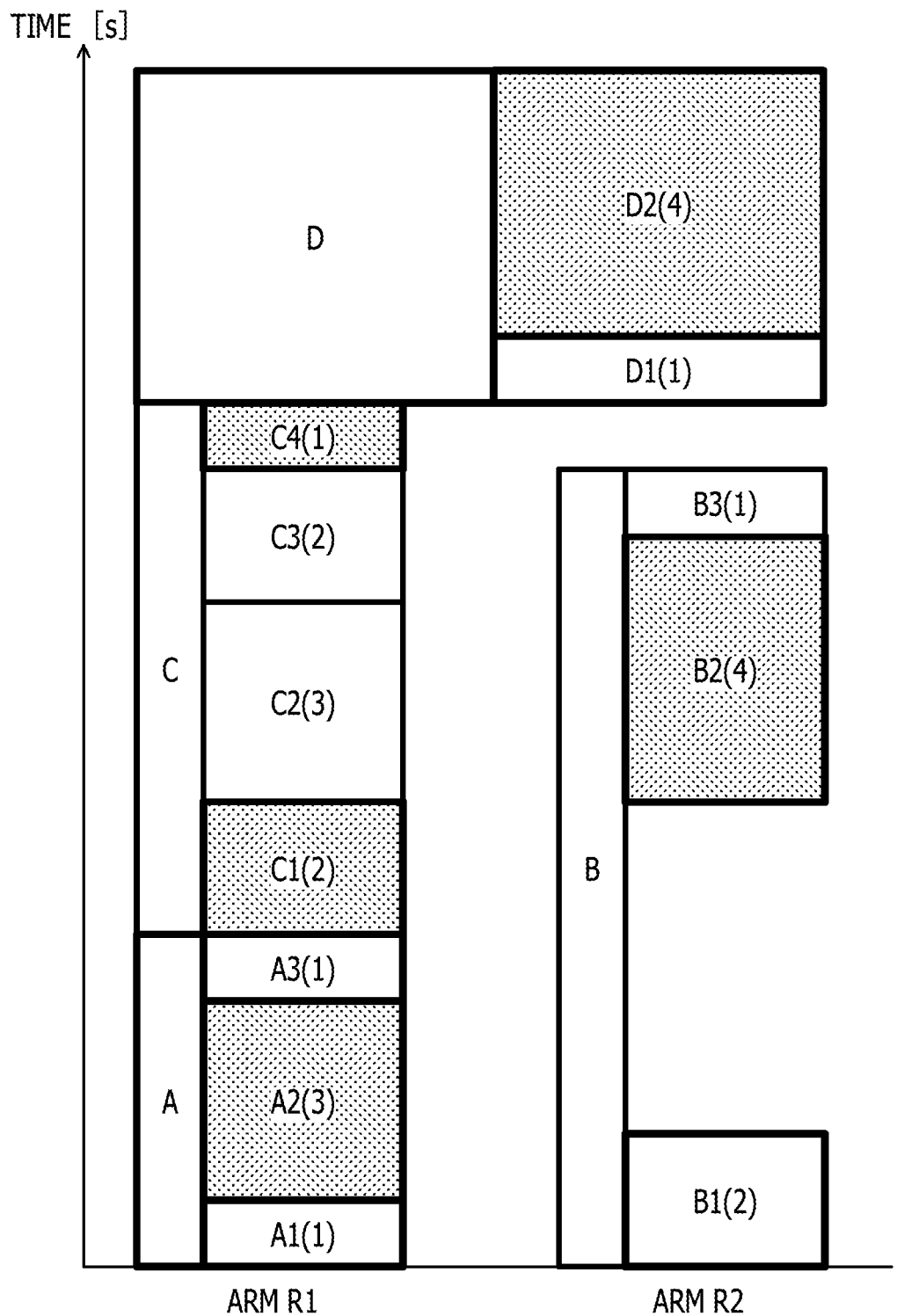
FIG. 14 is an eighth diagram for explaining the processing in FIG. 5.

In the next step S18, the task plan development unit 24 determines start time of all of the actions in the task X (=the task D). In this case, the task plan development unit 24 determines the start time of the respective actions in the task D, which is the collaborative task, by directly piling up the task D on the arms R1 and R2 as indicated in FIG. 14. Thereafter, the task plan development unit 24 returns to step S10.

Back in step S10, the task plan development unit 24 determines whether or not there is the next task on the task list (FIG. 6). Since there is the next task E, the determination in step S10 is affirmative and the task plan development unit 24 proceeds to step S12.

Figure 15:
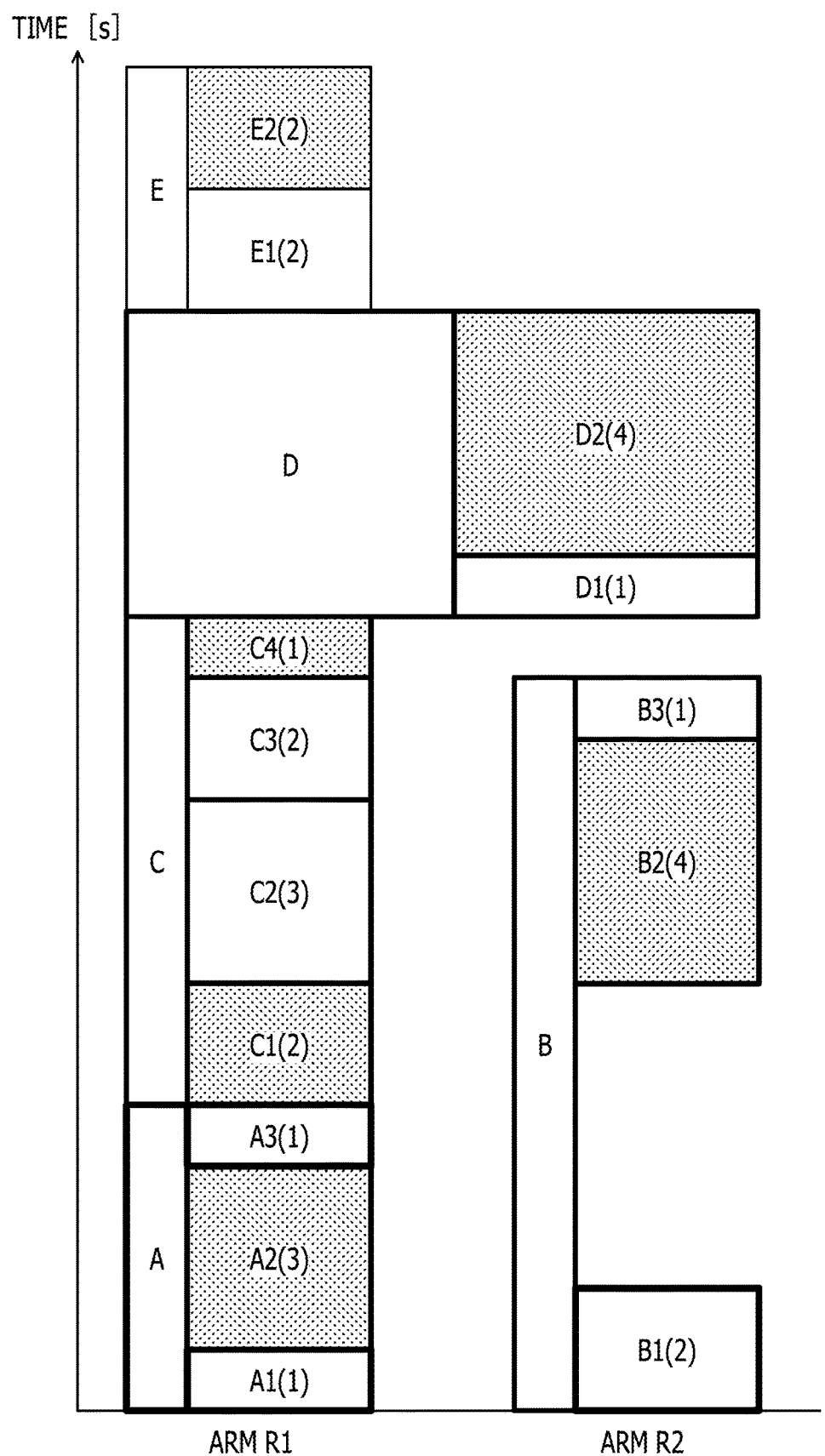
FIG. 15 is a ninth diagram for explaining the processing in FIG. 5.

In step S12, the task plan development unit 24 selects the task E from the task list as the next task X. In the next step S14, the task plan development unit 24 determines whether or not the task E is the collaborative task. In this case, the task E is the one-arm task. Accordingly, the determination in step S14 is negative and the task plan development unit 24 proceeds to step S20. In step S20, the task plan development unit 24 assigns the task E to an arm which is not assigned to any action with undetermined start time. In the case of FIG. 14, both of the arms R1 and R2 are the arms that are not assigned to any action with undetermined start time. Accordingly, the task plan development unit 24 assigns the task E to the arm R1 as illustrated in FIG. 15, for instance. Then, the task plan development unit 24 proceeds to step S22.

In step S22, the task plan development unit 24 determines whether or not there is an arm which has the assigned actions all with the determined start time. In the case of FIG. 15, the arm R2 has the assigned actions all with the determined start time. Accordingly, the determination in step S22 is affirmative and the task plan development unit 24 returns to step S10. Back in step S10, the task plan development unit 24 determines whether or not there is the next task on the task list (FIG. 6). Since there are no more subsequent tasks, the determination in Step S10 is negative and the task plan development unit 24 proceeds to step S32.

In step S32, the task plan development unit 24 determines start time of each action with undetermined start time. Specifically, the task plan development unit 24 determines the start time of the actions E1 and E2 of the task E assigned to the arm R1 as it is in FIG. 15.

Thus, the entire processing in FIG. 5 is completed. The task plan (see FIG. 15) for the robot system created at the stage of completion of the processing in FIG. 5 organizes the order of execution of the tasks and the actions so as to minimize the total task time while taking into account the collaborative tasks, the one-arm tasks, the interference actions, and the non-interference actions.

Figure 16:
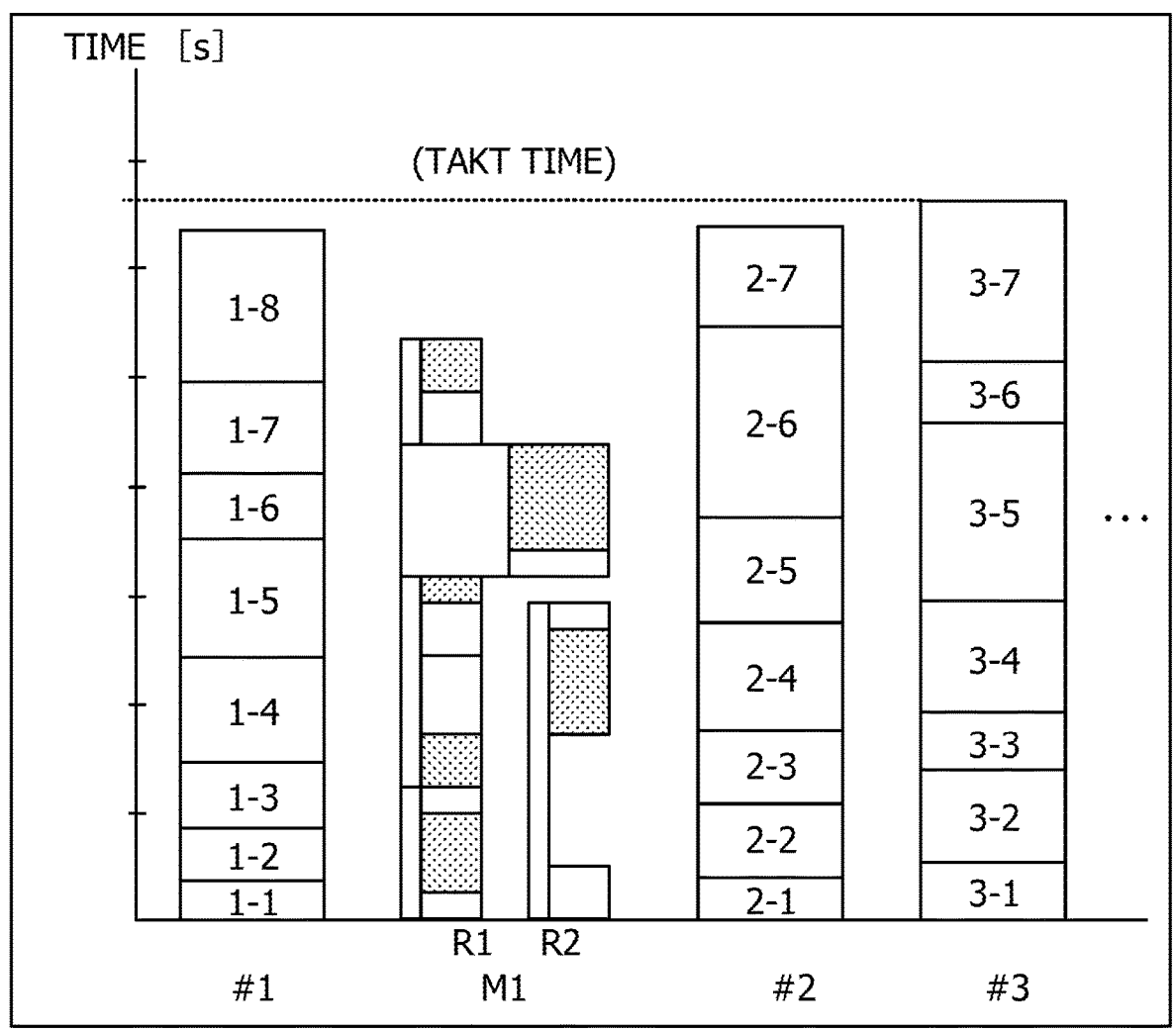
FIG. 16 is a diagram illustrating an example of a display screen.

When the entire processing in FIG. 5 is completed, the task plan development unit 24 sends the display control unit 26 information (the task plan) on the tasks that are assigned to the persons and the robot systems deployed at the sites for the respective processes in the assembly line. In this case, the display control unit 26 creates a display screen as illustrated in FIG. 16 based on the task plan developed by the task plan development unit 24, and causes the display unit 93 to display the created display screen. The display screen in FIG. 16 makes it possible to check the tasks assigned to the persons (#1, #2, #3, and so on) and to the robot systems (M1 and so on), and to check the order of the tasks (the start time of the tasks).

As apparent from the above description, in this embodiment, the task plan development unit 24 realizes a function as a judgment unit to judge whether or not the sites to carry out the target actions are likely to overlap each other by determining whether or not the first actions with undetermined start time assigned to the arms R1 and R2 are the interference actions. The task plan development unit 24 also realizes a function as a comparison unit to compare the case in which the target actions of the arm R1 are executed earlier than the target actions of the arm R2 with the case in which the target actions of the arm R2 are executed earlier than the target actions of the arm R1. The task plan development unit 24 also realizes a function as a determination unit to determine the order of execution of the target actions of the arm R1 and the target actions of the arm R2.

As described above in detail, according to this embodiment, the task plan development unit 24 determines whether or not the target actions assigned to the arms R1 and R2 are likely to interfere with each other (S26). When the target actions are determined to be likely to interfere with each other (S26: affirmative), the task plan development unit 24 compares the completion time of all of the target actions in the case of delaying the target actions of the arm R1 so as to avoid the interference of the target actions with the completion time of all of the target actions in the case of delaying the target actions of the arm R2 so as to avoid the interference of the target actions, and adopts the order of execution that has the earlier completion time (S30). In this way, it is possible to determine the appropriate order of execution in the case of causing both of the arms R1 and R2 to execute the target actions inclusive of the interference actions without conducting the optimization calculation. In this case, it is possible to determine the appropriate order of execution in a shorter time than the case of conducting the optimization calculation.

This embodiment describes the case in which the robot system includes two arms. However, without limitation to the foregoing, the robot system may include three or more arms. In the latter case as well, when at least two of first actions assigned to the respective arms with undetermined start time are the interference actions, it is possible to determine the appropriate order of execution of the actions as with the above-described embodiment.

It is possible to realize the functions of the above-described processing by using a computer. In this case, there are provided programs that describe the details of the processing regarding the functions to be provided to the processing apparatus. By causing the computer to execute the programs, the functions of the above-described processing are realized on the computer. The programs describing the details of the processing may be recorded on a computer-readable storage medium (except a carrier wave).

In the case of circulating the programs, the programs are recorded and sold in the form of a portable storage medium such as a digital versatile disc (DVD) and a compact disc read only memory (CD-ROM), for example. Alternatively, the programs may also be stored in a storage device in a server computer and transferred from the server computer to another computer.

The computer that executes the programs stores the programs recorded on the portable storage medium or the programs transferred from the server computer into a storage device of its own. Then, the computer reads the programs out of its own storage device and executes the processing in accordance with the programs. Instead, the computer may read the programs directly from the portable storage medium and execute the processing in accordance with the programs. Alternatively, the computer may receive the programs from the server computer at separate timings and execute the processing one by one in accordance with the received programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus comprising:
a memory; and a processor coupled to the memory, the processor being configured to perform processing, the processing including:
obtaining a determination result by determining whether a first task assigned to a first robot is associated with a first area overlapped with a second area with which a second task assigned to a second robot is associated;
in response to the determination result indicating that the first task is associated with the first area overlapped with the second area,
calculating a first end time in a first task order generated by adding a wait time before the first task to delay the first task until an end time of the second task, the first end time being an end time when all of the first and second tasks are to be completed in case of adding the wait time before the first task,
calculating a second end time in a second task order generated by adding the wait time before the second task to delay the second task until an end time of the first task, the second end time being an end time when all of the first and second tasks are to be completed in case of adding the wait time before the second task, and
obtaining a comparison result by comparing the first end time with the second end time;
in response to the comparison result indicating that the first end time is earlier than the second end time, selecting the first task order to cause the first and second robots to perform the first and second tasks in the selected first task; and
in response to the comparison result indicating that the second end time is earlier than the first end time, selecting the second task order to cause the first and second robots to perform the first and second tasks in the selected second task.

2. The apparatus according to claim 1, wherein at least one of the first task and the second task is any of a third task, a fourth task, and a fifth task, the third task being a task to carry out one action in an interference zone to be used by both of the first robot and the second robot, and then carry out one or more actions in a non-interference zone outside the interference zone, the fourth task being a task to carry out only one action in the interference zone, and the fifth task being a task to carry out only an action in the non-interference zone.

3. A method performed by a computer, the method comprising:
obtaining a determination result by determining whether a first task assigned to a first robot is associated with a first area overlapped with a second area with which a second task assigned to a second robot is associated;
in response to the determination result indicating that the first task is associated with the first area overlapped with the second area,
calculating a first end time in a first task order generated by adding a wait time before the first task to delay the first task until an end time of the second task, the first end time being an end time when all of the first and second tasks are to be completed in case of adding the wait time before the first task,
calculating a second end time in a second task order generated by adding the wait time before the second task to delay the second task until an end time of the first task, the second end time being an end time when all of the first and second tasks are to be completed in case of adding the wait time before the second task, and
obtaining a comparison result by comparing the first end time with the second end time;
in response to the comparison result indicating that the first end time is earlier than the second end time, selecting the first task order to cause the first and second robots to perform the first and second tasks in the selected first task; and
in response to the comparison result indicating that the second end time is earlier than the first end time, selecting the second task order to cause the first and second robots to perform the first and second tasks in the selected second task.

4. The method according to claim 3, wherein at least one of the first task and the second task is any of a third task, a fourth task, and a fifth task, the third task being a task to carry out one action in an interference zone to be used by both of the first robot and the second robot, and then carry out one or more actions in a non-interference zone outside the interference zone, the fourth task being a task to carry out only one action in the interference zone, and the fifth task being a task to carry out only an action in the non-interference zone.

5. A non-transitory computer-readable storage medium storing a program which causes a processor to perform processing for object recognition, the processing comprising:
obtaining a determination result by determining whether a first task assigned to a first robot is associated with a first area overlapped with a second area with which a second task assigned to a second robot is associated;
in response to the determination result indicating that the first task is associated with the first area overlapped with the second area,
calculating a first end time in a first task order generated by adding a wait time before the first task to delay the first task until an end time of the second task, the first end time being an end time when all of the first and second tasks are to be completed in case of adding the wait time before the first task,
calculating a second end time in a second task order generated by adding the wait time before the second task to delay the second task until an end time of the first task, the second end time being an end time when all of the first and second tasks are to be completed in case of adding the wait time before the second task, and
obtaining a comparison result by comparing the first end time with the second end time; and
in response to the comparison result indicating that the first end time is earlier than the second end time, selecting the first task order to cause the first and second robots to perform the first and second tasks in the selected first task; and
in response to the comparison result indicating that the second end time is earlier than the first end time, selecting the second task order to cause the first and second robots to perform the first and second tasks in the selected second task.

6. The non-transitory computer-readable storage medium according to claim 5, wherein at least one of the first task and the second task is any of a third task, a fourth task, and a fifth task, the third task being a task to carry out one action in an interference zone to be used by both of the first robot and the second robot, and then carry out one or more actions in a non-interference zone outside the interference zone, the fourth task being a task to carry out only one action in the interference zone, and the fifth task being a task to carry out only an action in the non-interference zone.

* * * * *